United States Patent
Inada

(10) Patent No.: US 11,236,770 B2
(45) Date of Patent: Feb. 1, 2022

(54) SERVO REGULATOR

(71) Applicant: KYB Corporation, Tokyo (JP)

(72) Inventor: Takanori Inada, Tokyo (JP)

(73) Assignee: KYB CORPORATION, Tokyo (JP)

(*) Notice: Subject to any disclaimer, the term of this patent is extended or adjusted under 35 U.S.C. 154(b) by 190 days.

(21) Appl. No.: 16/491,404

(22) PCT Filed: Mar. 13, 2018

(86) PCT No.: PCT/JP2018/009822
§ 371 (c)(1),
(2) Date: Sep. 5, 2019

(87) PCT Pub. No.: WO2018/168884
PCT Pub. Date: Sep. 20, 2018

(65) Prior Publication Data
US 2020/0032778 A1 Jan. 30, 2020

(30) Foreign Application Priority Data

Mar. 17, 2017 (JP) .............................. JP2017-053181

(51) Int. Cl.
*F15B 13/043* (2006.01)
*F15B 13/04* (2006.01)
(Continued)

(52) U.S. Cl.
CPC ...... *F15B 13/0402* (2013.01); *F15B 13/0433* (2013.01); *F04B 1/26* (2013.01);
(Continued)

(58) Field of Classification Search
CPC .. F15B 13/0402; F15B 13/043; F15B 13/044; F15B 13/0433; F15B 13/0435;
(Continued)

(56) References Cited

U.S. PATENT DOCUMENTS 2,969,045 A * 1/1961 Clar .................... F15B 13/0402
137/625.65
3,862,643 A * 1/1975 Dezelan ................ E02F 9/2285
137/625.63

(Continued)

FOREIGN PATENT DOCUMENTS

| JP | 2009-243430 A | 10/2009 |
| JP | 2009-243435 A | 10/2009 |
| JP | 2017-036713 A | 2/2017 |

*Primary Examiner* — Dustin T Nguyen
(74) *Attorney, Agent, or Firm* — Rabin & Berdo, P.C.

(57) ABSTRACT

A servo regulator includes servo piston, a first pressure chamber and a second pressure chamber, a spool, a biasing member provided on an outer periphery of the spool and configured to bias the spool, a first support portion configured to support one end portion of the biasing member when the spool is moved to a first direction where the pressure in the first pressure chamber is raised, and a second support portion configured to support other end portion of the biasing member when the spool is moved to a second direction where the pressure in the second pressure chamber is raised, wherein at least one of the first support portion and the second support portion is detachably provided on the spool.

9 Claims, 9 Drawing Sheets

(51) Int. Cl.
*F04B 1/26* (2006.01)
*F16H 61/431* (2010.01)
*F16K 11/07* (2006.01)
*F16K 31/06* (2006.01)

(52) U.S. Cl.
CPC ............ *F16H 61/431* (2013.01); *F16K 11/07* (2013.01); *F16K 31/0613* (2013.01); *Y10T 137/8671* (2015.04); *Y10T 137/86622* (2015.04)

(58) Field of Classification Search
CPC .... F15B 13/0442; F15B 13/0448; F04B 1/26; F04B 1/29; F04B 1/295; F04B 1/303; F04B 1/306; F04B 1/32; F04B 1/322; F04B 1/324; F04B 1/328; F16H 61/431; Y10T 137/86622; Y10T 137/8671; F16K 11/07
See application file for complete search history.

(56) References Cited

U.S. PATENT DOCUMENTS

| | | | | |
|---|---|---|---|---|
| 4,024,798 | A * | 5/1977 | Schexnayder | F15B 13/0402 91/436 |
| 5,108,070 | A * | 4/1992 | Tominaga | H01F 7/13 251/65 |
| 5,205,201 | A * | 4/1993 | Gollner | F04B 49/002 60/444 |
| 5,275,207 | A * | 1/1994 | Tonhauser | F02M 37/0023 123/198 DB |
| 5,316,044 | A * | 5/1994 | Szentes | F15B 13/0402 137/625.65 |
| 6,234,202 | B1 * | 5/2001 | Grill | F15B 13/0405 137/596.17 |
| 9,464,629 | B2 * | 10/2016 | Kato | F16K 31/06 |
| 9,903,484 | B2 * | 2/2018 | Hatano | F16K 31/124 |
| 10,697,477 | B2 * | 6/2020 | Sakashita | F15B 13/0442 |
| 2015/0226190 | A1 * | 8/2015 | Sakai | F04B 9/10 417/218 |

* cited by examiner

SERVO REGULATOR

TECHNICAL FIELD

The present invention relates to a servo regulator.

BACKGROUND ART

In a variable capacity piston pump mounted on a vehicle such as a construction machine, a discharge flowrate of the piston pump is adjusted by transmitting displacement of a servo piston of a servo regulator to a swash plate of the piston pump via an arm so as to change a tilting angle of the swash plate.

In the servo regulator disclosed in JP2009-243435A, the servo piston is moved by a change in a differential pressure between a first pressure chamber and a second pressure chamber. The first pressure chamber is connected to a pump through a pump port that is opened/closed by a first spool, and a second pressure chamber is connected to the pump through a pump port that is opened/closed by a second spool. When one of the first spool and the second spool is moved by a thrust of a solenoid against a feedback spring, an oil pressure is led to one of the first pressure chamber and the second pressure chamber. At this time, the other of the first spool and the second spool connects the other of the first pressure chamber and the second pressure chamber to a tank.

Moreover, in the servo regulator disclosed in JP2009-243435A, the feedback spring is contracted by a feedback link rotationally moved in accordance with the movement of the servo piston. Since the biasing force of the feedback spring is changed, one of the first spool and the second spool is moved so that the biasing force of the feedback spring is balanced with the thrust of the solenoid. As a result, the pressure of one of the first pressure chamber and the second pressure chamber is automatically adjusted so as to hold the servo piston at a desired position. As a result, the tilting angle of the swash plate of the piston pump is maintained at a desired angle.

SUMMARY OF INVENTION

In the servo regulator disclosed in JP2009-243435A, the first spool and the second spool are formed as separate members. Thus, even though the solenoid which moves the first spool is stopped, and the first spool is returned to an initial position, the second spool is not returned to the initial position in some cases, for example. In this case, a size of an opening of a passage that connects the second pressure chamber to the tank is different from the size of the opening in a state where the second spool is returned to the initial position. Thus, a working oil does not flow in a desired flowrate between the second pressure chamber and the tank, and there is a concern that an operation of the servo regulator becomes unstable.

In order to make the operation of the servo regulator stable, use of a spool in which the first spool and the second spool are integrated can be considered.

However, in the servo regulator disclosed in JP2009-243435A, annular stepped portions are formed on outer peripheries of the first spool and the second spool, and the feedback spring is provided between these annular stepped portions. Thus, if the spool in which the first spool and the second spool are integrated is to be used, when the feedback spring is assembled on the outer periphery of the spool, an inner diameter of the feedback spring needs to be enlarged so as to insert the annular stepped portion inside the feedback spring. When the feedback spring is deformed, a characteristic of the feedback spring is changed, and there is a concern that a desired control characteristic cannot be obtained.

The present invention has an object to improve stability of the operation of the servo regulator.

According to one aspect of the present invention, a servo regulator includes a servo piston slidably accommodated in a case, a first pressure chamber and a second pressure chamber provided by facing both end portions of the servo piston, a spool configured to control pressures in the first pressure chamber and the second pressure chamber by moving by a solenoid, a biasing member provided on an outer periphery of the spool and configured to bias the spool against a thrust of the solenoid, a first support portion provided on the spool and configured to support one of end portions of the biasing member when the spool is moved to a first direction where the pressure in the first pressure chamber is raised, and a second support portion provided on the spool and configured to support the other end portion of the biasing member when the spool is moved to a second direction where the pressure in the second pressure chamber is raised, wherein at least one of the first support portion and the second support portion is detachably provided on the spool.

DESCRIPTION OF EMBODIMENTS

Figure 1:
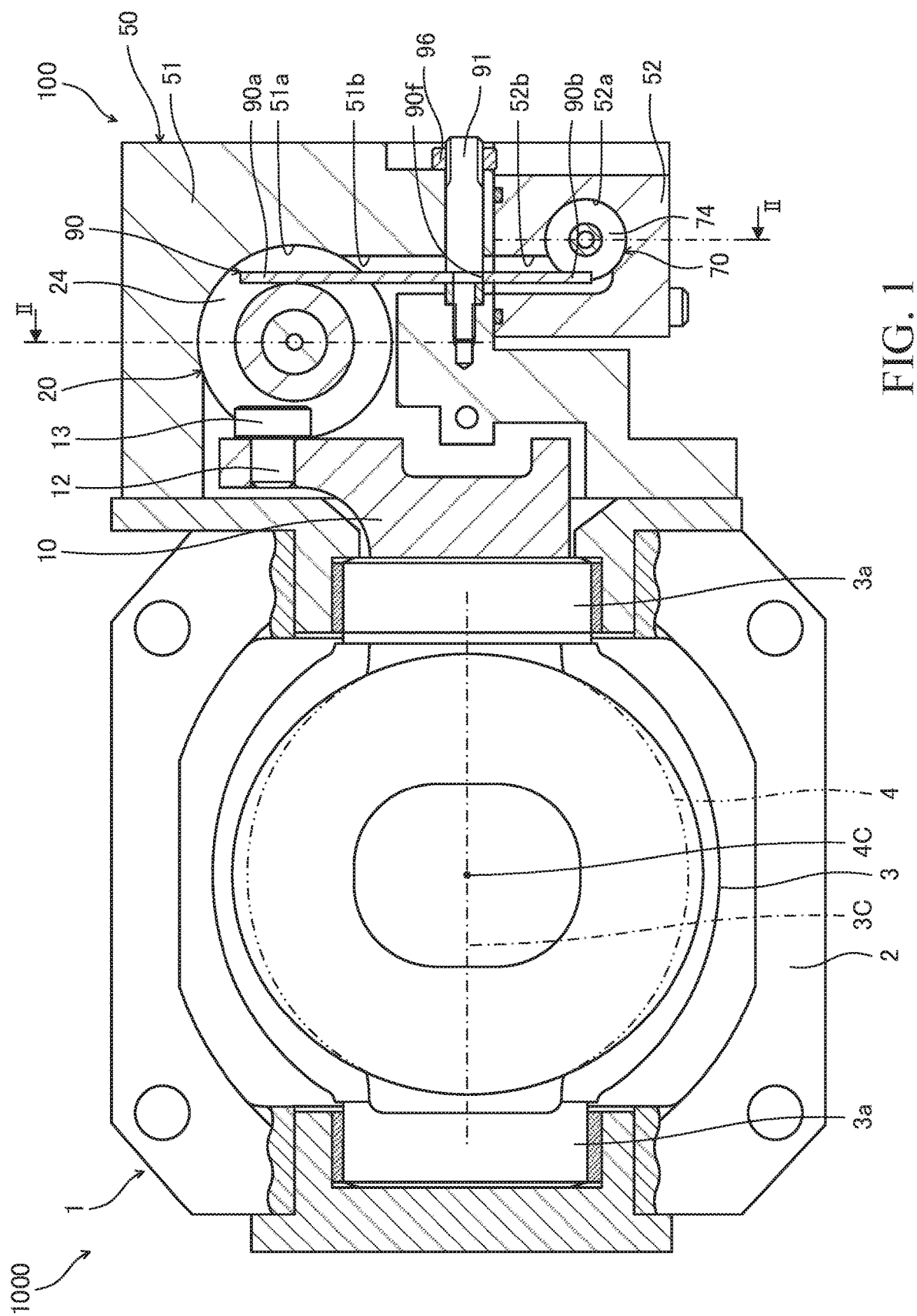
FIG. 1 is a sectional view of a servo regulator according to a first embodiment of the present invention and illustrates a state where it is mounted on a variable capacity piston pump.

Hereinafter, servo regulators 100 and 200 according to embodiments of the present invention will be described by referring to the drawings.

First Embodiment

First, the servo regulator 100 according to a first embodiment of the present invention will be described by referring to FIGS. 1 to 8.

As illustrated in FIG. 1, a pump apparatus 1000 includes a variable capacity piston pump 1 and the servo regulator 100 assembled to the piston pump 1. The piston pump 1 is used for a hydrostatic continuously variable transmission (HST: Hydro Static Transmission) that supplies a working oil to a running hydraulic motor of a vehicle such as a construction machine.

The piston pump 1 includes a swash plate 3 provided capable of rotational movement in a housing 2 via a pair of trunnion shafts 3a and a cylinder block 4 that is rotated by power of an engine of the vehicle. A rotation center axis 4C of the cylinder block 4 crosses a rotational movement center axis 3C of the swash plate 3.

The cylinder block 4A is formed with a plurality of cylinders (not shown). The plurality of cylinders extends along the rotation center axis 4C of the cylinder block 4 and is disposed around the rotation center axis 4C.

A piston (not shown) is slidably accommodated in the cylinder, and a capacity chamber is defined by the pistons in the cylinder. The capacity chamber alternatively communicates with a port for sucking and a port for discharge with rotation of the cylinder block 4.

One end of the piston is in contact with the swash plate 3 via a piston shoe (not shown). In a state where the swash plate 3 is tilted with respect to the rotation center axis 4C of the cylinder block 4, the piston is moved with respect to the cylinder block 4 with the rotation of the cylinder block 4, and a volume of the capacity chamber is changed.

In a suction stroke in which the piston is moved in the cylinder so that the capacity chamber is enlarged, the working oil is sucked into the capacity chamber through the port for sucking. In a discharge stroke in which the piston is moved in the cylinder so that the capacity chamber is contracted, the working oil is discharged to the port for discharge from the capacity chamber.

In the piston pump 1, a stroke amount of the piston can be changed by changing an angle (tilting angle) of the swash plate 3 with respect to the rotation center axis 4C of the cylinder block 4. As a result, a flowrate of the working oil that is discharged from the piston pump 1 can be changed.

When the tilting angle of the swash plate 3 is 0° (zero degrees), that is, when the swash plate 3 is at a neutral position, the piston is not moved with respect to the cylinder block 4 regardless of the rotation of the cylinder block 4. Thus, the volume of the capacity chamber is not changed, and the discharge flowrate of the piston pump 1 is 0 (zero). The working oil is not supplied to the running hydraulic motor, and rotation of the running hydraulic motor is stopped.

The piston pump 1 is a 2-direction discharge type pump, and the port for sucking or discharge of the working oil is switched by switching the tilting direction of the swash plate 3 with the tilting angle 0° as a boundary. By switching the discharge direction of the working oil of the piston pump 1, a rotation direction of the running hydraulic motor is changed, and forward running and reverse running of the vehicle is switched.

Figure 2:
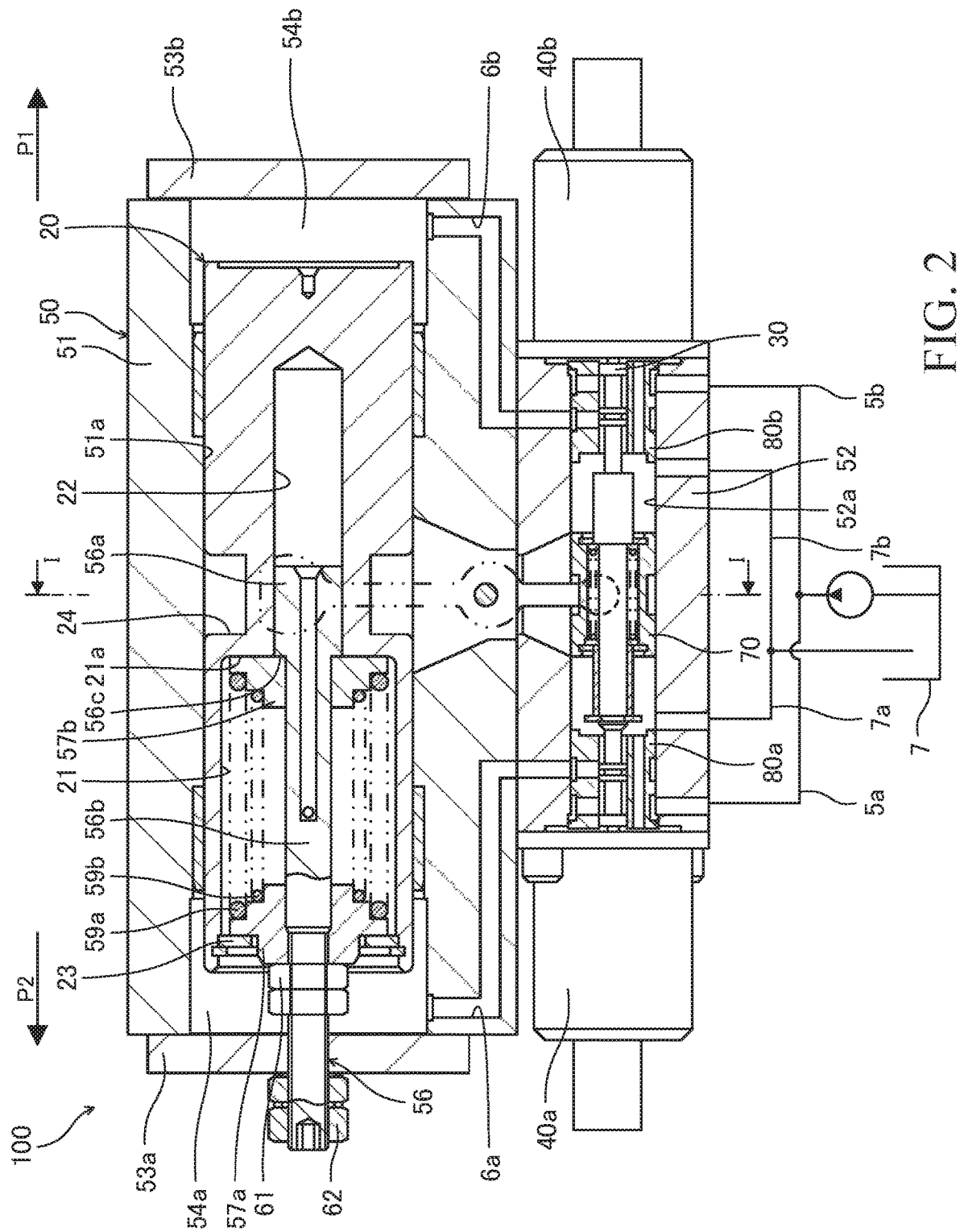
FIG. 2 is a partially sectional view of the servo regulator along II-II line in FIG. 1.

As illustrated in FIGS. 1 and 2, the servo regulator 100 includes a servo piston 20 coupled with the swash plate 3 of the piston pump 1 via an arm 10 and a spool 30 that controls a pressure of the working oil acting on the servo piston 20. The spool 30 is moved by a first solenoid 40a and a second solenoid 40b.

The servo piston 20 and the spool 30 are accommodated in a case 50. The case 50 has a first case member 51 mounted on the housing 2 of the piston pump 1 and a second case member 52 mounted on the first case member 51.

The first case member 51 is formed with a first accommodating hole 51a, and the second case member 52 is formed with a second accommodating hole 52a. In a state where the second case member 52 is mounted on the first case member 51, the first accommodating hole 51a and the second accommodating hole 52a are substantially in parallel. The servo piston 20 is slidably accommodated in the first accommodating hole 51a, and the spool 30 is accommodated in the second accommodating hole 52a.

Both opening ends of the first accommodating hole 51a are closed by a first cover 53a and a second cover 53b, respectively. An inside of the first accommodating hole 51a is partitioned by the servo piston 20 into a first pressure chamber 54a and a second pressure chamber 54b. Specifically, the first pressure chamber 54a is defined by an inner peripheral surface of the first accommodating hole 51a, one end surface of the servo piston 20, and the first cover 53a and is provided by facing one end surface of the servo piston 20. Similarly, the second pressure chamber 54b is defined by the inner peripheral surface of the first accommodating hole 51a, the other end surface of the servo piston 20, and the second cover 53b and is provided by facing the other end surface of the servo piston 20.

The servo piston 20 is moved in the first accommodating hole 51a by the pressure of the working oil in the first pressure chamber 54a and the second pressure chamber 54b. When the pressure in the first pressure chamber 54a is larger than the pressure in the second pressure chamber 54b, the servo piston 20 is moved to a P1 direction (right direction in FIG. 2) for enlarging the first pressure chamber 54a and for contracting the second pressure chamber 54b. When the pressure in the second pressure chamber 54b is larger than the pressure in the first pressure chamber 54a, the servo piston 20 is moved to a P2 direction (left direction in FIG. 2) for enlarging the second pressure chamber 54b and for contracting the first pressure chamber 54a.

The servo piston 20 is guided by a guide rod 56 fixed to the first cover 53a. A rod-side end portion of the servo piston 20 is formed with an accommodating recess portion 21 capable of accommodating a first retainer 57a and a second retainer 57b mounted on an outer periphery of the guide rod 56. Moreover, the servo piston 20 is formed with a guide hole 22 extending in an axial direction from a bottom surface 21a of the accommodating recess portion 21.

The guide rod 56 and the servo piston 20 are disposed coaxially. A diameter of a distal end portion 56a of the guide rod 56 is made larger than that of a shaft portion 56b and is slidably inserted into the guide hole 22 of the servo piston 20.

The first retainer 57a and the second retainer 57b are slidably provided on the shaft portion 56b of the guide rod 56. A first piston spring 59a and a second piston spring 59b are provided in a compressed state between the first retainer 57a and the second retainer 57b. The first piston spring 59a and the second piston spring 59b bias the servo piston 20 at a neutral position.

As illustrated in FIG. 2, when the servo piston 20 is at the neutral position, the first retainer 57a is brought into contact with a stopper ring 23 fixed to an opening end of the accommodating recess portion 21 and is brought into contact with a nut 61 screwed with the shaft portion 56b. The second retainer 57b is brought into contact with the bottom surface 21a of the accommodating recess portion 21 of the servo piston 20 and is brought into contact with a stepped portion 56c formed between the distal end portion 56a of the guide rod 56 and the shaft portion 56b.

When the servo piston 20 is moved to the P1 direction from the neutral position, the first retainer 57a is pressed by the stopper ring 23 fixed to the servo piston 20. As a result, the first retainer 57*a* is moved along the shaft portion 56*b* of the guide rod 56 so as to be separated from the nut 61 screwed with the shaft portion 56*b* of the guide rod 56.

At this time, the second retainer 57*b* is brought into contact with the stepped portion 56*c* of the guide rod 56 and is not moved with respect to the guide rod 56. Therefore, the first piston spring 59*a* and the second piston spring 59*b* between the first retainer 57*a* and the second retainer 57*b* are compressed, and a spring reaction force for returning the servo piston 20 to the neutral position becomes larger.

On the other hand, when the servo piston 20 is moved to the P2 direction from the neutral position, the second retainer 57*b* is pressed by the bottom surface 21*a* of the servo piston 20. As a result, the second retainer 57*b* is moved along the shaft portion 56*b* of the guide rod 56 so as to be separated from the stepped portion 56*c* of the guide rod 56.

At this time, the first retainer 57*a* is brought into contact with the nut 61 and is not moved with respect to the guide rod 56. Therefore, the first piston spring 59*a* and the second piston spring 59*b* between the first retainer 57*a* and the second retainer 57*b* are compressed, and the spring reaction force for returning the servo piston 20 to the neutral position becomes larger.

The neutral position of the servo piston 20 can be adjusted by adjusting a fastening position of the guide rod 56 to the first cover 53*a* and by fixing the guide rod 56 to the first cover 53*a* via a nut 62.

As illustrated in FIGS. 1 and 2, an annular groove 24 is formed on the outer periphery at a center in the axial direction of the servo piston 20. The arm 10 is coupled with the annular groove 24.

Specifically, a pin 12 is provided at a distal end of the arm 10, and a slide metal 13 is rotatably supported by the pin 12. The slide metal 13 is inserted into the annular groove 24 of the servo piston 20.

As described above, the arm 10 is coupled with the annular groove 24 via the pin 12 and the slide metal 13. In FIG. 2, illustration of the arm 10, the pin 12, and the slide metal 13 is omitted.

When the servo piston 20 is moved, the slide metal 13 is moved together with the servo piston 20. As a result, the arm 10 is rotationally moved around the rotational movement center axis 3C, and the swash plate 3 is tilted. As described above, displacement of the servo piston 20 is transmitted to the swash plate 3 via the arm 10. The discharge flowrate of the piston pump 1 is changed by the tilting of the swash plate 3.

Figure 3:
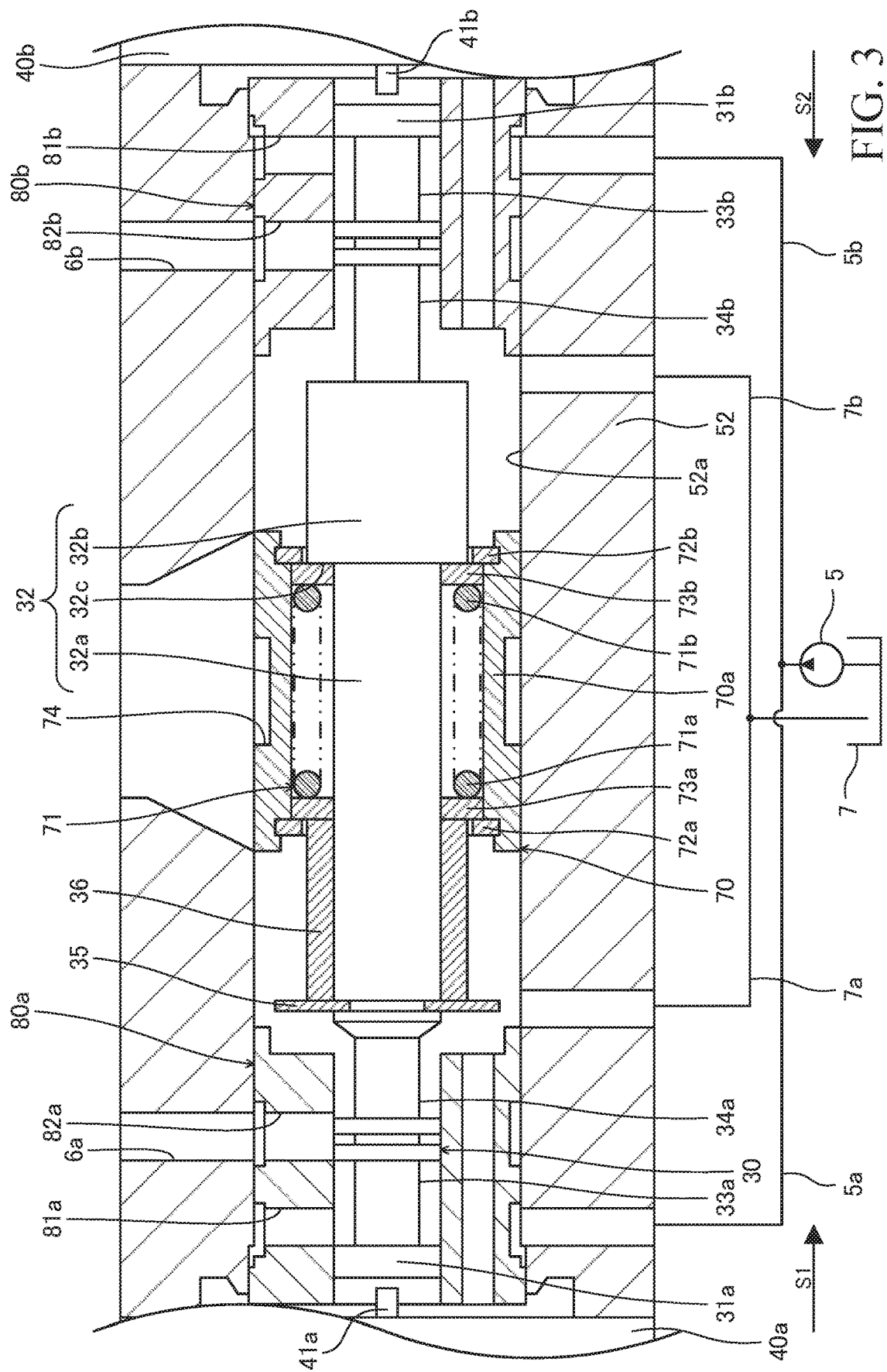
FIG. 3 is a partially enlarged sectional view illustrating a periphery of a spool and illustrates a state where both a first solenoid and a second solenoid are not operated.

As illustrated in FIGS. 2 and 3, a cylindrical first sleeve 80*a* and second sleeve 80*b* are provided at both end positions of the second accommodating hole 52*a*. The first sleeve 80*a* has a supply port 81*a* connected to a hydraulic pump (hydraulic source) 5 through the supply passage 5*a* and a main port 82*a* connected to the first pressure chamber 54*a* through a main passage 6*a*. The second sleeve 80*b* has a supply port 81*b* connected to the hydraulic pump 5 (hydraulic source) through the supply passage 5*b* and a main port 82*b* connected to the second pressure chamber 54*b* through a main passage 6*b*.

An inner peripheral surface of the second accommodating hole 52*a* is formed with openings of drain passages 7*a* and 7*b* connected to a tank 7. The openings of the drain passages 7*a* and 7*b* are located between the first sleeve 80*a* and the second sleeve 80*b*.

A spring holder (holding member) 70 is provided at a substantially center position of the second accommodating hole 52*a*. The spring holder 70 holds a spool spring (biasing member) 71 which biases the spool 30. The spool spring 71 is a coil spring.

The spring holder 70 has a substantially cylindrical holder body (accommodating portion) 70*a* which accommodates the spool spring 71 and a first snap ring (fifth support portion) 72*a* and a second snap ring (sixth support portion) 72*b* provided on an inner periphery of the holder body 70*a*. An outer diameter of the holder body 70*a* is substantially equal to an inner diameter of the second accommodating hole 52*a* of the second case member 52 and slides in the second accommodating hole 52*a*.

The first snap ring 72*a* is provided detachably in the vicinity of one of the opening ends of the holder body 70*a*, while the second snap ring 72*b* is detachably provided in the vicinity of the other opening end of the holder body 70*a*. The spool spring 71 is provided between the first snap ring 72*a* and the second snap ring 72*b*.

An annular first retainer (third support portion) 73*a* is provided between the first snap ring 72*a* and one end portion 71*a* of the spool spring 71, and an annular second retainer (fourth support portion) 73*b* is provided between the second snap ring 72*b* and the other end portion 71*b* of the spool spring 71. The spool spring 71 is provided in a compressed state between the first retainer 73*a* and the second retainer 73*b*. In other words, the first retainer 73*a* supports the one end portion 71*a* of the spool spring 71 and the second retainer 73*b* supports the other end portion 71*b* of the spool spring 71.

The spool 30 has a first control portion 31*a* that controls the pressure in the first pressure chamber 54*a*, a second control portion 31*b* that controls the pressure in the second pressure chamber 54*b*, and a connecting portion 32 that connects the first control portion 31*a* and the second control portion 31*b*. The first control portion 31*a*, the second control portion 31*b*, and the connecting portion 32 are formed integrally.

The first control portion 31*a* is slidably inserted into the first sleeve 80*a*. The second control portion 31*b* is slidably inserted into the second sleeve 80*b*. The connecting portion 32 is inserted through the spool spring 71.

An outer periphery of the first control portion 31*a* of the spool 30 is formed with an annular groove 33*a* and an annular groove 34*a*. The annular groove 33*a* connects the supply port 81*a* and the main port 82*a* in accordance with a position of the spool 30, and the annular groove 34*a* connects the main port 82*a* and a drain passage 7*a*.

An outer periphery of the second control portion 31*b* of the spool 30 is formed with an annular groove 33*b* and an annular groove 34*b*. The annular groove 33*b* connects the supply port 81*b* and the main port 82*b* in accordance with a position of the spool 30, and the annular groove 34*b* connects the main port 82*b* and a drain passage 7*b*.

The spool 30 is moved to an S1 direction (first direction) from the first control portion 31*a* toward the second control portion 31*b* by being pressed by a first plunger 41*a* provided on the first solenoid 40*a*. When the spool 30 is moved to the S1 direction, the annular groove 33*a* connects the supply port 81*a* and the main port 82*a* and thus, the working oil that is discharged from the hydraulic pump 5 is supplied to the first pressure chamber 54*a*. That is, the S1 direction is a direction where the pressure in the first pressure chamber 54*a* is raised.

Moreover, the spool 30 is moved to an S2 direction (second direction) from the second control portion 31*b* toward the first control portion 31*a* by being pressed by a second plunger 41*b* provided on the second solenoid 40*b*.

When the spool 30 is moved to the S2 direction, the annular groove 33b connects the supply port 81b and the main port 82b and thus, the working oil that is discharged from the hydraulic pump 5 is supplied to the second pressure chamber 54b. That is, the S2 direction is a direction where the pressure in the second pressure chamber 54b is raised.

The first solenoid 40a and the second solenoid 40b are proportional solenoids in which thrusts (suction forces) of the first plunger 41a and the second plunger 41b are changed in proportion to an applied current value. The first solenoid 40a and the second solenoid 40b are mounted on the second case member 52 so as to close the opening end of the second accommodating hole 52a. The first solenoid 40a and the second solenoid 40b are connected to a controller, not shown, through wirings, respectively.

When the first solenoid 40a and the second solenoid 40b are in a non-driven state, the spool 30 is located at an initial position. At this time, the first control portion 31a of the spool 30 and the first plunger 41a are faced with each other at a predetermined interval (initial interval). Moreover, the second control portion 31b of the spool 30 and the second plunger 41b are faced with each other at a predetermined interval (initial interval).

The connecting portion 32 of the spool 30 has a small diameter portion (insertion portion) 32a and a large diameter portion (second support portion) 32b having an outer diameter larger than an outer diameter of the small diameter portion 32a. The small diameter portion 32a is formed continuously from the first control portion 31a, and the large diameter portion 32b is formed continuously from the second control portion 31b. A stepped portion 32c is formed between the small diameter portion 32a and the large diameter portion 32b.

The first retainer 73a and the second retainer 73b are provided on the small diameter portion 32a. That is, the small diameter portion 32a is inserted through the first retainer 73a, the spool spring 71, and the second retainer 73b. The outer diameter of the small diameter portion 32a is substantially equal to the inner diameters of the first retainer 73a and the second retainer 73b, and the first retainer 73a and the second retainer 73b slide on the outer periphery of the small diameter portion 32a.

A cylindrical collar (first support portion) 36 is provided on a side opposite to the spool spring 71 with respect to the first retainer 73a. The snap ring 35 is fixed in the vicinity of the first control portion 31a in the small diameter portion 32a of the spool 30, and the removal of the collar 36 from the small diameter portion 32a is prevented by the snap ring 35. By removing the snap ring 35 from the spool 30, the collar 36 can be removed from the spool 30. As described above, the collar 36 is detachably provided on the spool 30.

An outer diameter of the collar 36 is larger than the inner diameter of the first retainer 73a, and the collar 36 limits movements of the first retainer 73a and the spool spring 71 to a direction of getting closer to the first control portion 31a. The outer diameter of the collar 36 is smaller than the inner diameters of the first snap ring 72a and the holder body 70a, and the first snap ring 72a and the holder body 70a are capable of relative movement with respect to the spool 30 without being limited by the collar 36.

The outer diameter of the large diameter portion 32b of the spool 30 is larger than the inner diameter of the second retainer 73b, and the large diameter portion 32b limits movements of the second retainer 73b and the spool spring 71 to the direction of getting closer to the second control portion 31b. The outer diameter of the large diameter portion 32b is smaller than the inner diameters of the second snap ring 72b and the holder body 70a, and the second snap ring 72b and the holder body 70a are capable of relative movement with respect to the spool 30 without being limited by the large diameter portion 32b.

Figure 4:
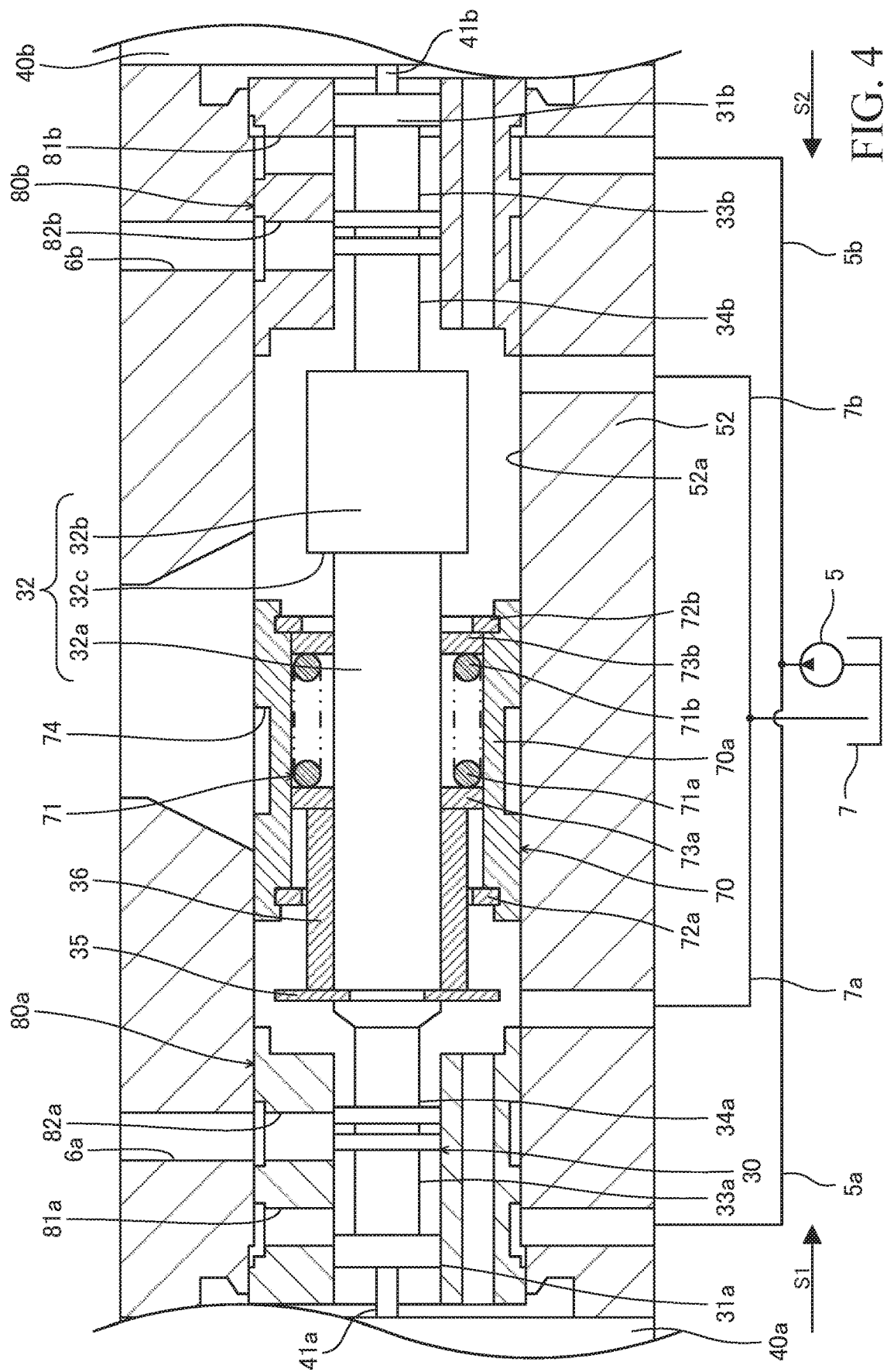
FIG. 4 is a partially enlarged sectional view illustrating the periphery of the spool and illustrates a state where the first solenoid is operated.

As illustrated in FIG. 4, when the spring holder 70 is moved to the direction of getting closer to the first control portion 31a with respect to the spool 30, the second retainer 73b is pressed by the second snap ring 72b. The second retainer 73b is separated away from the stepped portion 32c of the connecting portion 32 and is relatively moved to the spool 30 along the small diameter portion 32a.

At this time, the first retainer 73a is brought into contact with the end surface of the collar 36 and is not moved to the connecting portion 32. Therefore, the spool spring 71 is compressed between the first retainer 73a and the second retainer 73b. As a result, a reaction force of the spool spring 71 becomes larger.

When the second retainer 73b is separated away from the stepped portion 32c, the first retainer 73a is brought into contact with the end surface of the collar 36 and thus, the reaction force of the spool spring 71 is transmitted to the spool 30 through the first retainer 73a, the collar 36, and the snap ring 35. Therefore, the spool 30 is biased to the direction of shutting off the communication between the supply port 81a and the main port 82a by the spool spring 71.

As described above, the collar 36 functions as the first support portion that supports the one end portion 71a of the spool spring 71 via the first retainer 73a when the spring holder 70 is moved to the direction of getting closer to the first control portion 31a with respect to the spool 30. The second retainer 73b functions as the fourth support portion relatively moving with respect to the spool 30 by supporting the other end portion 71b of the spool spring 71. The second snap ring 72b functions as the sixth support portion that supports the other end portion 71b of the spool spring 71 via the second retainer 73b.

Figure 5:
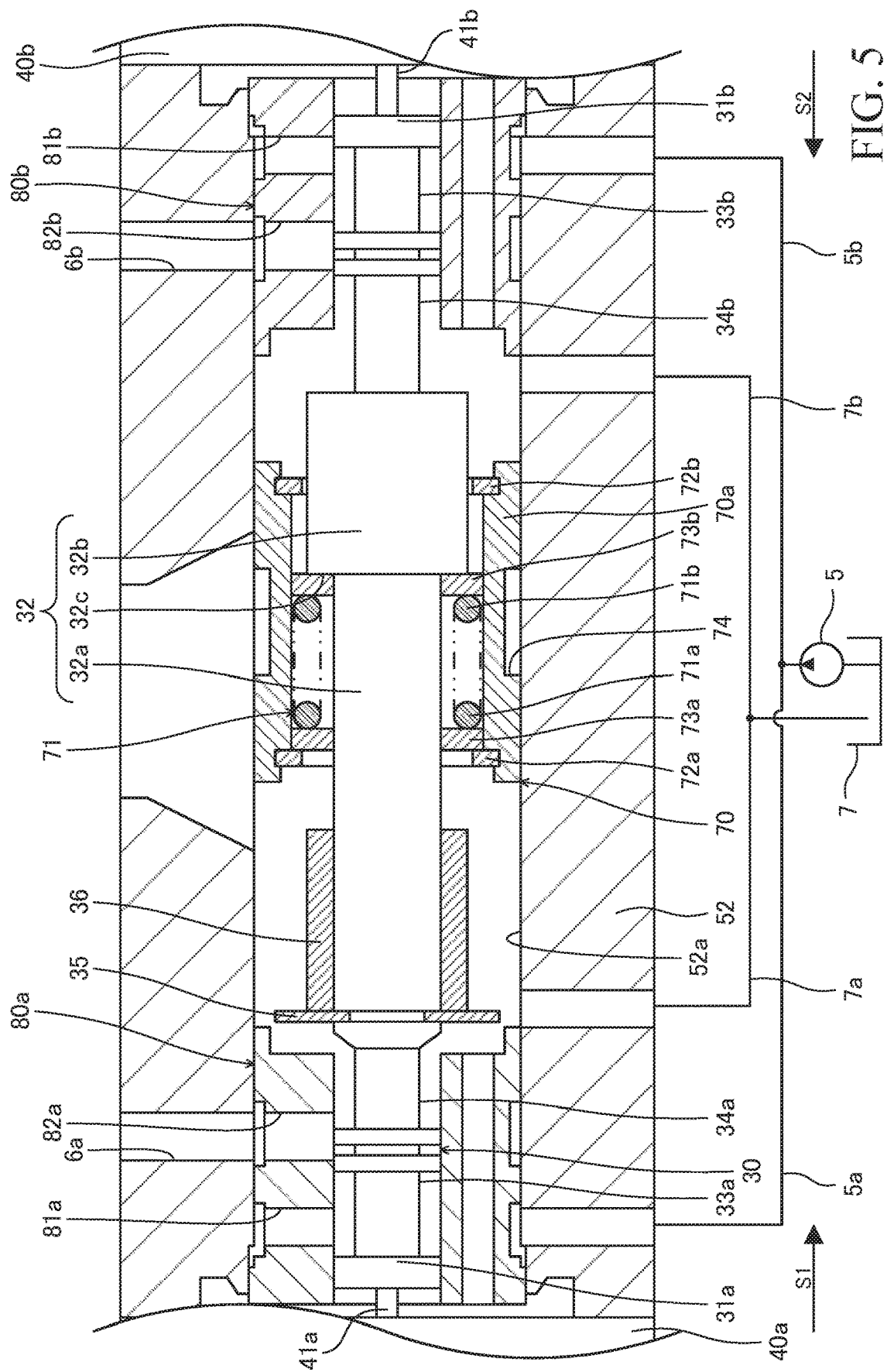
FIG. 5 is a partially enlarged sectional view illustrating the periphery of the spool and illustrates a state where the second solenoid is operated.

On the other hand, as illustrated in FIG. 5, when the spring holder 70 is moved to the direction of getting closer to the second control portion 31b with respect to the spool 30, the first retainer 73a is pressed by the first snap ring 72a. The first retainer 73a is separated away from the end surface of the collar 36 and is relatively moved to the spool 30 along the small diameter portion 32a.

At this time, the second retainer 73b is brought into contact with the stepped portion 32c and is not moved to the connecting portion 32. Therefore, the spool spring 71 is compressed between the first retainer 73a and the second retainer 73b. As a result, a reaction force of the spool spring 71 becomes larger.

When the first retainer 73a is separated away from the end surface of the collar 36, the second retainer 73b is brought into contact with the stepped portion 32c and thus, the reaction force of the spool spring 71 is transmitted to the spool 30 through the second retainer 73b. Therefore, the spool 30 is biased to the direction of shutting off the communication between the supply port 81b and the main port 82b by the spool spring 71.

As described above, the large diameter portion 32b functions as the second support portion that supports the other end portion 71b of the spool spring 71 via the second retainer 73b when the spring holder 70 is moved to the direction of getting closer to the second control portion 31b with respect to the spool 30. The first retainer 73a functions as the third support portion relatively moving with respect to the spool 30 by supporting the one end portion 71a of the spool spring 71. The first snap ring 72a functions as the fifth support portion that supports the one end portion 71a of the spool spring 71 via the first retainer 73a.

Figure 6:
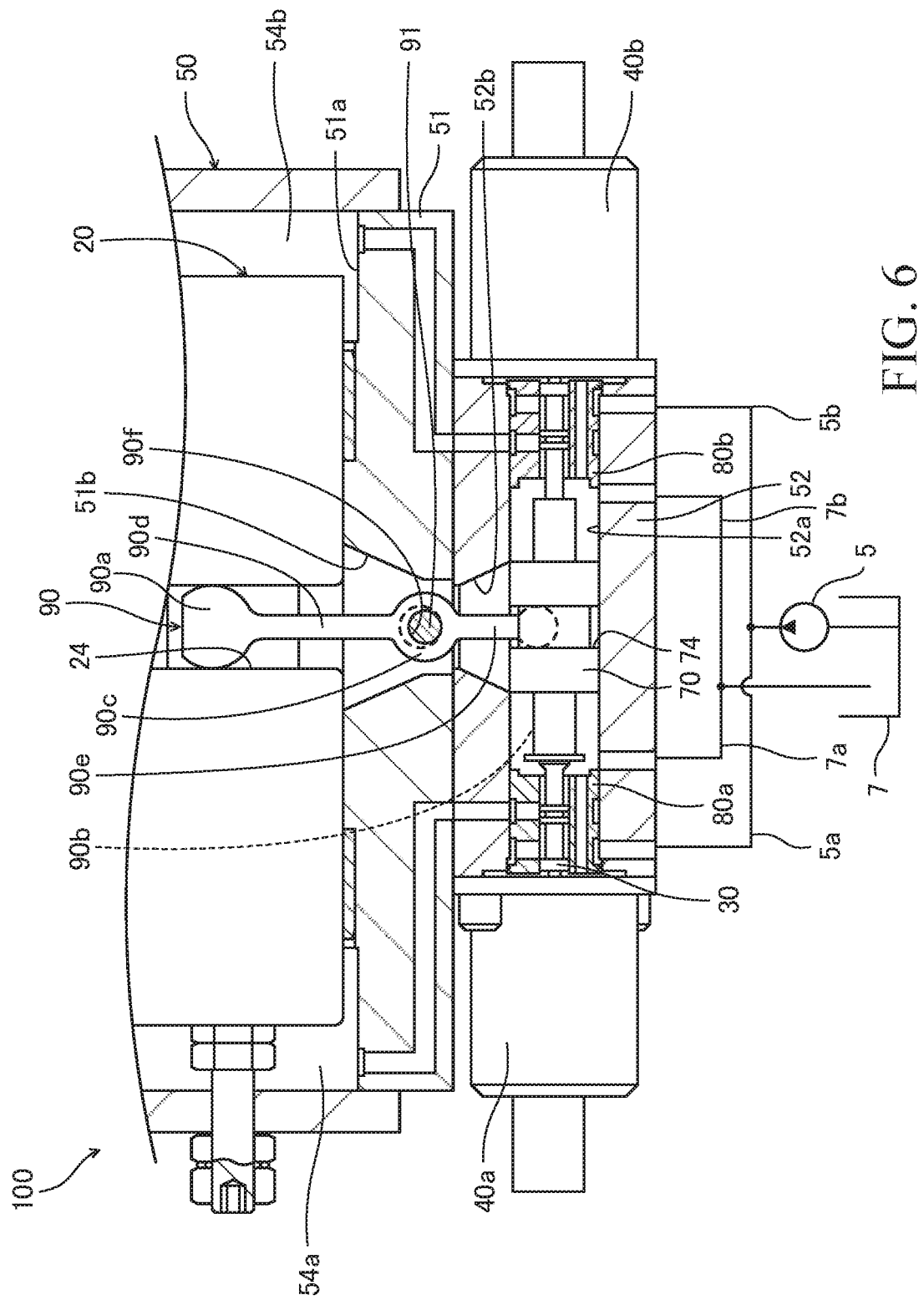
FIG. 6 is a sectional view of the servo regulator illustrating connection between a servo piston and a feedback link correspondingly to FIG. 2.

As illustrated in FIGS. 1 and 6, the servo regulator 100 further includes a feedback link 90 that transmits displacement of the servo piston 20 to the spring holder 70 and a support shaft 91 that supports the feedback link 90, capable of rotational movement.

The feedback link 90 extends between the servo piston 20 and the spring holder 70. Specifically, the first case member 51 is formed with a first insertion hole 51b opened in the inner peripheral surface of the first accommodating hole 51a, and the second case member 52 is formed with a second insertion hole 52b opened in the inner peripheral surface of the second accommodating hole 52a. The first insertion hole 51b and the second insertion hole 52b continue to each other, and the feedback link 90 extends between the servo piston 20 and the spring holder 70 through the first insertion hole 51b and the second insertion hole 52b.

A first end portion 90a of the feedback link 90 is inserted into the annular groove 24 of the servo piston 20. As a result, the feedback link 90 is coupled with the servo piston 20.

The first end portion 90a of the feedback link 90 is located on a side opposite to the slide metal 13 with respect to the center axis of the servo piston 20. Moreover, the feedback link 90 extends in a tangent direction of the annular groove 24, and a part of the feedback link 90 is disposed in the annular groove 24 so as to cross the servo piston 20.

A second end portion 90b of the feedback link 90 is coupled with the spring holder 70. Specifically, an outer periphery of the holder body 70a in the spring holder 70 is formed with an annular groove 74, and the second end portion 90b is inserted into the annular groove 74.

As described above, the feedback link 90 is coupled with the servo piston 20 and also coupled with the spring holder 70. Since the servo piston 20 is coupled with the swash plate 3 via the arm 10, the feedback link 90 is coupled with the swash plate 3 via the servo piston 20 and the arm 10. Similarly, the spring holder 70 is coupled with the swash plate 3 via the feedback link 90, the servo piston 20, and the arm 10.

Moreover, the feedback link 90 has an intermediate portion 90c located between the first end portion 90a and the second end portion 90b, a coupling portion 90d that couples the first end portion 90a and the intermediate portion 90c, and a coupling portion 90e that couples the second end portion 90b and the intermediate portion 90c. A hole 90f is formed in the intermediate portion 90c.

The support shaft 91 is fixed to the first case member 51 in a state of being inserted through the hole 90f of the feedback link 90. In other words, the feedback link 90 is supported, capable of rotational movement, by the first case member 51 via the support shaft 91. Since the servo piston 20 and the spring holder 70 are coupled via the feedback link 90, when the servo piston 20 is moved, and the feedback link 90 is rotationally moved, the spring holder 70 is moved to a direction opposite to a moving direction of the servo piston 20.

Figure 7:
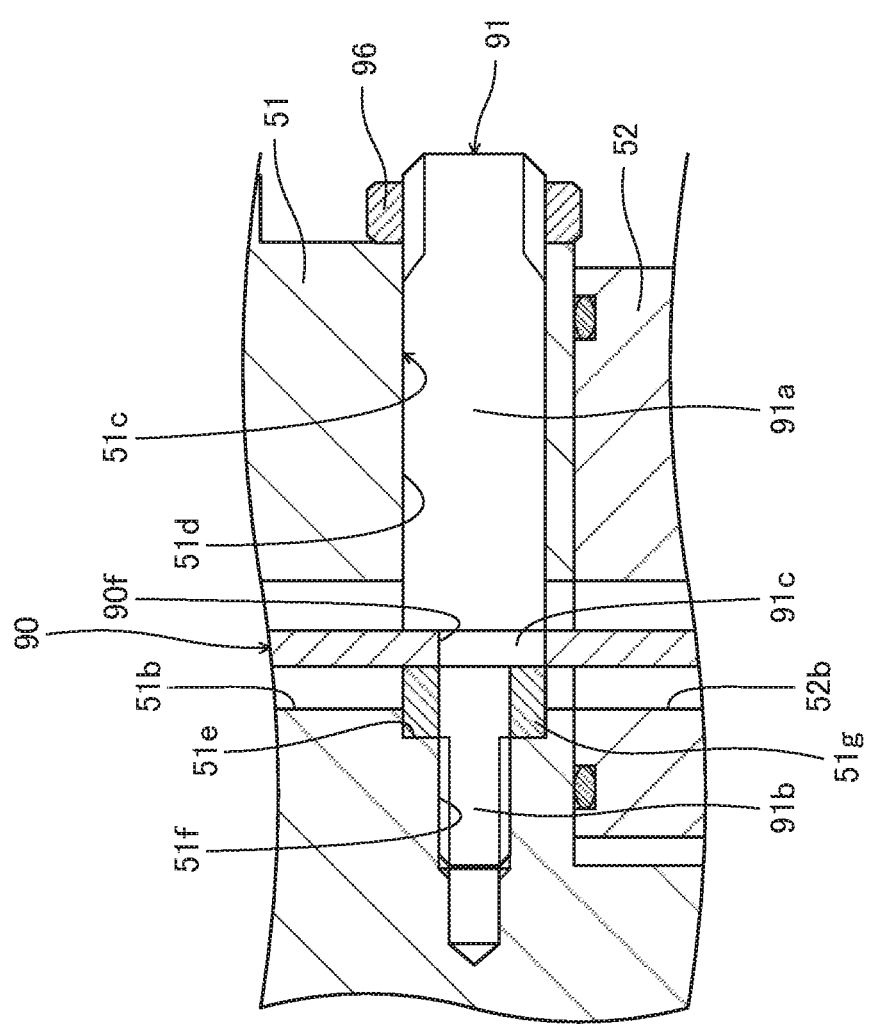
FIG. 7 is a partially enlarged sectional view illustrating a periphery of a support shaft.

As illustrated in FIG. 7, the support shaft 91 is fixed to a hole 51c formed in the first case member 51. The hole 51c has a first hole portion 51d opened in a side surface of the first case member 51 and a second hole portion 51f opened in a bottom surface 51e of the first hole portion 51d.

The first hole portion 51d crosses the first insertion hole 51b of the first case member 51. The second hole portion 51f is formed coaxially with the first hole portion 51d, and a female screw is formed on an inner periphery of the second hole portion 51f. A bush 51g is disposed on the bottom surface 51e of the first hole portion 51d. An outer diameter of the bush 51g is substantially equal to an inner diameter of the first hole portion 51d, and an inner diameter of the bush 51g is substantially equal to the inner diameter of the second hole portion 51f. The outer diameter of the bush 51g does not have to be equal to the inner diameter of the first hole portion 51d but only needs to have a size that can be inserted into the first hole portion 51d.

The support shaft 91 has a base portion 91a inserted through the first hole portion 51d, a distal end portion 91b formed coaxially with the base portion 91a, and an eccentric portion 91c which is eccentric with respect to the base portion 91a and the distal end portion 91b. An outer diameter of the distal end portion 91b is smaller than an outer diameter of the base portion 91a. An outer diameter of the eccentric portion 91c is smaller than the outer diameter of the base portion 91a and larger than the outer diameter of the distal end portion 91b.

An outer periphery of the distal end portion 91b is formed with a male screw and is screwed with the female screw of the second hole portion 51f. The base portion 91a protrudes to an outer side of the first case member 51 from the first hole portion 51d. The outer periphery of the base portion 91a is formed with a male screw, and a fixing nut 96 is screwed with the outer periphery of the base portion 91a. The support shaft 91 is fixed to the first case member 51 by tightening the fixing nut 96 in a state where the female screw of the second hole portion 51f is screwed with the male screw of the distal end portion 91b.

The eccentric portion 91c is provided between the base portion 91a and the distal end portion 91b and is located in the first insertion hole 51b of the first case member 51. An outer diameter of the eccentric portion 91c is substantially equal to the inner diameter of the hole 90f of the feedback link 90, and the eccentric portion 91c is inserted through the hole 90f. That is, the feedback link 90 is supported, capable of rotational movement around the center axis of the eccentric portion 91c.

As described above, the eccentric portion 91c is eccentric to the base portion 91a and the distal end portion 91b. Thus, when the support shaft 91 is rotated with respect to the first case member 51, the center of the eccentric portion 91c is displaced. As a result, the center of the hole 90f of the feedback link 90, that is, a rotational movement center axis of the feedback link 90 is displaced.

As illustrated in FIG. 6, the feedback link 90 is coupled with the servo piston 20 and the spring holder 70. Thus, the servo piston 20 and the spring holder 70 are displaced with displacement of the rotational movement center of the feedback link 90.

Spring constants of the first piston spring 59a and the second piston spring 59b (see FIG. 2) are larger than the spring constant of the spool spring 71 (see FIG. 3) provided on the inner periphery of the spring holder 70. Thus, a displacement amount of the servo piston 20 is smaller than the displacement amount of the spring holder 70. That is, the displacement of the rotational movement center of the feedback link 90 mainly displaces the spring holder 70. The spool spring 71 is moved by the displacement of the spring holder 70, and the neutral position of the spool 30 is changed.

As described above, in the servo regulator 100, the neutral position of the spool 30 can be adjusted by rotating the support shaft 91.

Subsequently, an operation of the servo regulator 100 will be described by referring to FIGS. 1 to 5.

When a driver operates a control lever of the vehicle so that the vehicle goes backward, a current according to the operation amount of the control lever is given to the first solenoid 40*a*, and the first plunger 41*a* of the first solenoid 40*a* moves the spool 30 at the initial position to the S1 direction (see FIG. 4).

As illustrated in FIGS. 2 and 4, when the spool 30 is moved by the first plunger 41*a* to the S1 direction, the annular groove 33*a* of the first control portion 31*a* connects the supply port 81*a* and the main port 82*a* to each other. The working oil that is discharged from the hydraulic pump 5 is led to the first pressure chamber 54*a* through the supply port 81*a*, the annular groove 33*a*, the main port 82*a*, and the main passage 6*a*.

Since the second control portion 31*b* is coupled with the first control portion 31*a* by the connecting portion 32, the second control portion 31*b* is moved to the direction in which the first control portion 31*a* is moved. At this time, the second control portion 31*b* shuts off the communication between the supply port 81*b* and the main port 82*b*, while it connects the main port 82*b* and the drain passage 7*b*. Thus, a tank pressure is led to the second pressure chamber 54*b* through the drain passage 7*b* and the main port 82*b*.

Since a pilot pressure is led to the first pressure chamber 54*a* and the tank pressure is led to the second pressure chamber 54*b*, the servo piston 20 is moved to the P1 direction from the neutral position against the biasing forces of the first piston spring 59*a* and the second piston spring 59*b*. Since the slide metal 13 (see FIG. 1) is inserted into the annular groove 24 of the servo piston 20, the slide metal 13 (see FIG. 1) is moved to the P1 direction, and the arm 10 is rotationally moved.

With the rotational movement of the arm 10, the swash plate 3 of the piston pump 1 is tilted to one side, and the tilting angle of the swash plate 3 is changed. As a result, the working oil is supplied to the running motor from the piston pump 1, and the running hydraulic motor is reversed, and the vehicle goes backward.

As illustrated in FIG. 6, since the first end portion 90*a* of the feedback link 90 is inserted into the annular groove 24 of the servo piston 20, when the servo piston 20 is moved to the P1 direction, the first end portion 90*a* is moved to the P1 direction. The feedback link 90 is rotationally moved by the movement of the first end portion 90*a*, and the second end portion 90*b* of the feedback link 90 is moved. As a result, the spring holder 70 is moved to the S2 direction.

As illustrated in FIG. 4, when the spring holder 70 is moved to the S2 direction with respect to the spool 30, the second snap ring 72*b* moves the second retainer 73*b* to the S2 direction. Since the second retainer 73*b* is separated away from the stepped portion 32*c* of the spool 30, the end portion 71*b* of the spool spring 71 is supported by the second snap ring 72*b* through the second retainer 73*b*.

On the other hand, the first retainer 73*a* is brought into contact with the end surface of the collar 36 and is not moved with respect to the spool 30. Since the first retainer 73*a* is separated away from the first snap ring 72*a*, the end portion 71*a* of the spool spring 71 is supported by the collar 36 through the first retainer 73*a*.

While the collar 36 is moved to the S1 direction with the spool 30, the second snap ring 72*b* is relatively moved to the S2 direction with respect to the spool 30 and thus, the spool spring 71 is compressed by the first retainer 73*a* and the second retainer 73*b*. As a result, the reaction force (biasing force) of the spool spring 71 to return the spool 30 to the initial position is increased.

As described above, the feedback link 90 changes the biasing force of the spool spring 71 in accordance with the movement of the servo piston 20, that is, the change in the tilting angle of the swash plate 3.

When the biasing force of the spool spring 71 is changed, the spool 30 is moved so that the biasing force of the spool spring 71 and the thrust of the first plunger 41*a* of the first solenoid 40*a* are balanced. As a result, the working oil pressure in the first pressure chamber 54*a* is adjusted so as to hold the servo piston 20 at the desired position. As a result, the servo piston 20 is also stopped at a predetermined position, and the tilting angle of the swash plate 3 of the piston pump 1 is maintained at the desired predetermined angle.

On the other hand, when the driver operates the control lever so that the vehicle goes forward, the current according to the operation amount of the control lever is given to the second solenoid 40*b*, and the second plunger 41*b* of the second solenoid 40*b* moves the spool 30 to the S2 direction (see FIG. 5).

When the spool 30 is moved to the S2 direction by the second plunger 41*b*, the annular groove 33*b* of the second control portion 31*b* connects the supply port 81*b* and the main port 82*b*. The working oil that is discharged from the hydraulic pump 5 is led to the second pressure chamber 54*b* through the supply port 81*b*, the annular groove 33*b*, the main port 82*b*, and the main passage 6*b*.

Since the first control portion 31*a* is coupled with the second control portion 31*b* by the connecting portion 32, the first control portion 31*a* is moved to the direction where the second control portion 31*b* is moved. At this time, the first control portion 31*a* shuts off the communication between the supply port 81*a* and the main port 82*a*, while it connects the main port 82*a* and the drain passage 7*a*. Thus, the tank pressure is led to the first pressure chamber 54*a* through the drain passage 7*a* and the main port 82*a*.

Since the pilot pressure is led to the second pressure chamber 54*b* and the tank pressure is led to the first pressure chamber 54*a*, the servo piston 20 is moved to the P2 direction from the neutral position in FIG. 2 against the biasing forces of the first piston spring 59*a* and the second piston spring 59*b*. The slide metal 13 (see FIG. 1) is moved to the P2 direction, and the arm 10 is rotationally moved. As a result, the swash plate 3 of the piston pump 1 is tilted to the other side, the running hydraulic motor is rotated forward, and the vehicle is advanced.

As illustrated in FIG. 6, since the first end portion 90*a* of the feedback link 90 is inserted into the annular groove 24 of the servo piston 20, when the servo piston 20 is moved in the P2 direction, the first end portion 90*a* of the feedback link 90 is moved to the P2 direction. The feedback link 90 is rotationally moved by the movement of the first end portion 90*a*, and the second end portion 90*b* of the feedback link 90 is moved. As a result, the spring holder 70 is moved to the S1 direction.

As illustrated in FIG. 5, when the spring holder 70 is moved to the S1 direction with respect to the spool 30, the first snap ring 72*a* moves the first retainer 73*a* to the S1 direction. Since the first retainer 73*a* is separated away from the collar 36, the end portion 71*a* of the spool spring 71 is supported by the first snap ring 72*a* through the first retainer 73*a*.

On the other hand, the second retainer 73*b* is brought into contact with the stepped portion 32*c* of the spool 30 and is not moved with respect to the spool 30. Since the second retainer 73*b* is separated away from the second snap ring 72b, the end portion 71b of the spool spring 71 is supported by the large diameter portion 32b of the spool 30 through the second retainer 73b.

Since the large diameter portion 32b of the spool 30 is moved to the S2 direction with the spool 30, and the first snap ring 72a is relatively moved to the S1 direction with respect to the spool 30, the spool spring 71 is compressed by the first retainer 73a and the second retainer 73b. As a result, the reaction force (biasing force) of the spool spring 71 to return the spool 30 to the initial position is increased.

As described above, the feedback link 90 changes the biasing force of the spool spring 71 in accordance with the movement of the servo piston 20, that is, the change in the tilting angle of the swash plate 3.

Then, the spool 30 is moved by the biasing force of the spool spring 71, and the pressure in the second pressure chamber 54b is adjusted so as to hold the servo piston 20 at the desired position. As a result, the tilting angle of the swash plate 3 of the piston pump 1 is maintained at the desired angle.

According to the servo regulator 100, the spool 30 is driven by the first solenoid 40a and the second solenoid 40b, and the pressure in the first pressure chamber 54a and the second pressure chamber 54b is controlled so as to change the position of the servo piston 20, whereby the tilting of the swash plate 3 of the piston pump 1 can be controlled.

Subsequently, an assembling method of the servo regulator 100 will be described by referring to FIG. 8. Here, the method of assembling the spool spring 71 to the spool 30 will be mainly described.

Figure 8:
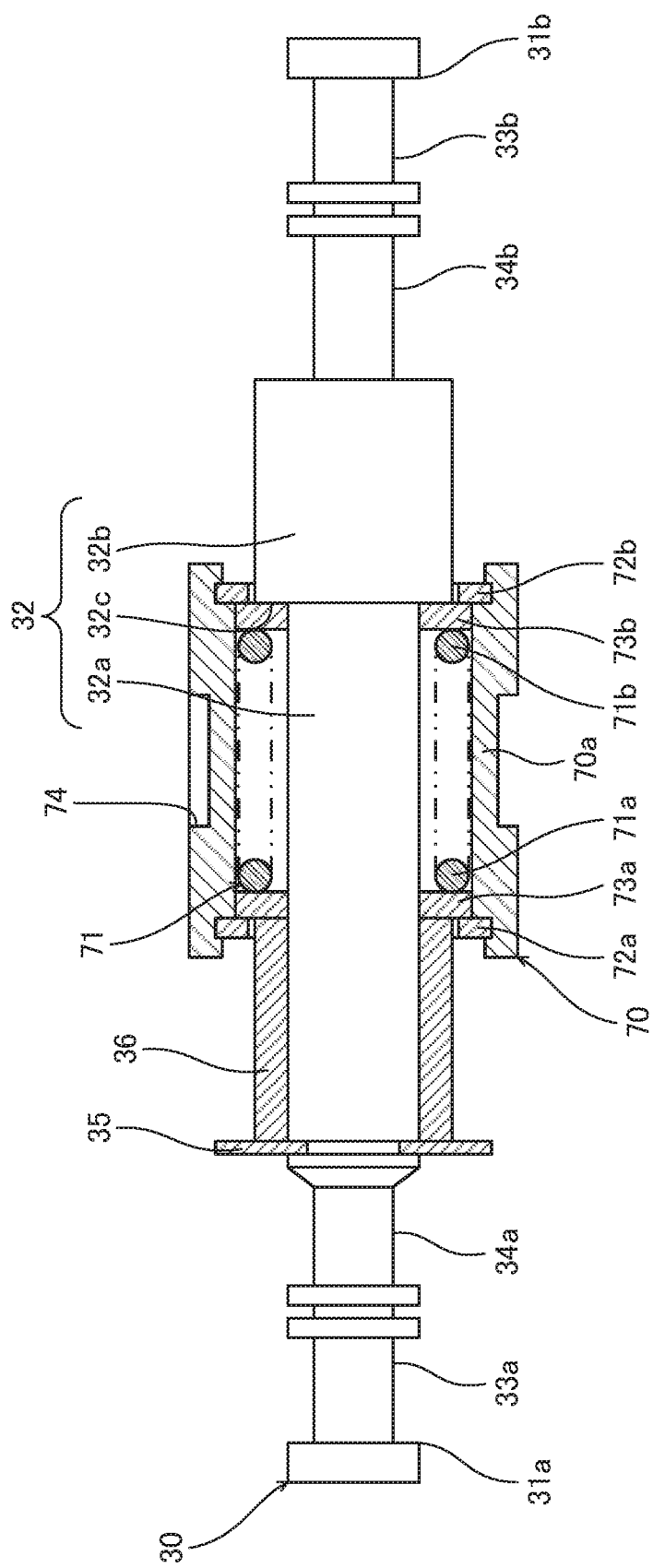
FIG. 8 is a view for explaining a method of assembling a spool spring to the spool.

First, as illustrated in FIG. 8, the spool 30 is inserted into the holder body 70a to which the second snap ring 72b is fixed. Subsequently, the second retainer 73b is disposed on the outer periphery of the small diameter portion 32a of the spool 30 and is inserted into the holder body 70a.

The spool spring 71 and the first retainer 73a are disposed on the outer periphery of the small diameter portion 32a of the spool 30 and inserted into the holder body 70a. At this time, since the collar 36 is removed from the spool 30, the spool spring 71 and the first retainer 73a can be assembled to the spool 30 without deformation. Moreover, since the first snap ring 72a is removed from the holder body 70a, the spool spring 71 and the first retainer 73a can be assembled to the spool 30 without deformation. After that, the first snap ring 72a is fixed to the holder body 70a.

The spool 30 is inserted into the collar 36, and the collar 36 is disposed on the outer periphery of the small diameter portion 32a. After that, the snap ring 35 is fixed to the small diameter portion 32a. Removal of the collar 36 from the small diameter portion 32a is prevented by the snap ring 35.

As described above, assembling of the spool spring 71 to the spool 30 is completed.

In the servo regulator 100, the collar 36 is detachably provided on the spool 30. Thus, when the servo regulator 100 is assembled, the spool spring 71 can be assembled to the integrated spool 30 without deformation by removing the collar 36 from the spool 30. Therefore, a change in the characteristic of the spool spring 71 can be prevented, and a desired control characteristic can be obtained.

Moreover, since the spool 30 is formed as a single component, when the hydraulic pump 5 and the first pressure chamber 54a are connected by movement of the spool 30, the second pressure chamber 54b is connected to the tank 7 through a passage having an opening of a predetermined size. Thus, the fluctuation in the flowrate of the working oil flowing between the second pressure chamber 54b and the tank 7 can be reduced with the rise of the pressure in the first pressure chamber 54a, and the operation of the servo regulator 100 can be made stable.

Moreover, in the servo regulator 100, when the spool 30 is moved to the S2 direction, the other end portion 71b of the spool spring 71 is supported by the large diameter portion 32b of the spool 30, and the one end portion 71a of the spool spring 71 is supported by the first snap ring 72a relatively moving with respect to the spool 30 in accordance with the movement of the servo piston 20. Thus, the spool 30 is biased by the one spool spring 71 both when the spool 30 is moved to the S1 direction and to the S2 direction. Therefore, fluctuation in the control characteristic caused by the fluctuation in the characteristic of the spool spring 71 can be reduced.

Moreover, the spring holder 70 is positioned by the both end portions 71a and 71b of the spool spring 71 via the first retainer 73a and the second retainer 73b. Thus, the biasing force of the spool spring 71 can be increased by compressing the spool spring 71 by the first retainer 73a or the second retainer 73b with the movement of the spool 30 with respect to the spring holder 70. Therefore, the spool 30 can be biased by the one spool spring 71 both when the spool 30 is moved to the S1 direction and to the S2 direction, and fluctuation in the control characteristic can be reduced.

Moreover, the first snap ring 72a is detachably provided on the holder body 70a. Thus, when the servo regulator 100 is assembled, the spool spring 71 can be accommodated in the holder body 70a without deformation by removing the first snap ring 72a from the holder body 70a. Therefore, a change in the characteristic of the spool spring 71 can be prevented, and the stability of the operation of the servo regulator 100 can be improved.

In the servo regulator 100, both the first snap ring 72a and the second snap ring 72b are detachably provided on the holder body 70a. The second snap ring 72b may be provided on the holder body 70a undetachably. That is, at least one of the first snap ring 72a and the second snap ring 72b only needs to be detachably provided on the holder body 70a.

Moreover, the large diameter portion 32b functions as the second support portion in the servo regulator 100. Thus, the second support portion can be formed integrally on the spool 30. Therefore, the number of components can be reduced, and assembling performances of the servo regulator 100 can be improved while the stability of the operation of the servo regulator 100 is improved.

In this embodiment, the stepped portion 32c is formed between the small diameter portion 32a and the large diameter portion 32b, but the stepped portion 32c does not have to be formed. The large diameter portion 32b may be formed having a taper shape so that the outer diameter is gradually enlarged from the small diameter portion 32a, for example.

Second Embodiment

Subsequently, a servo regulator 200 according to a second embodiment of the present invention will be described by referring to FIG. 9. The same reference numerals are given to the same constitutions as those of the servo regulator 100 according to the first embodiment, and the description will be omitted.

Figure 9:
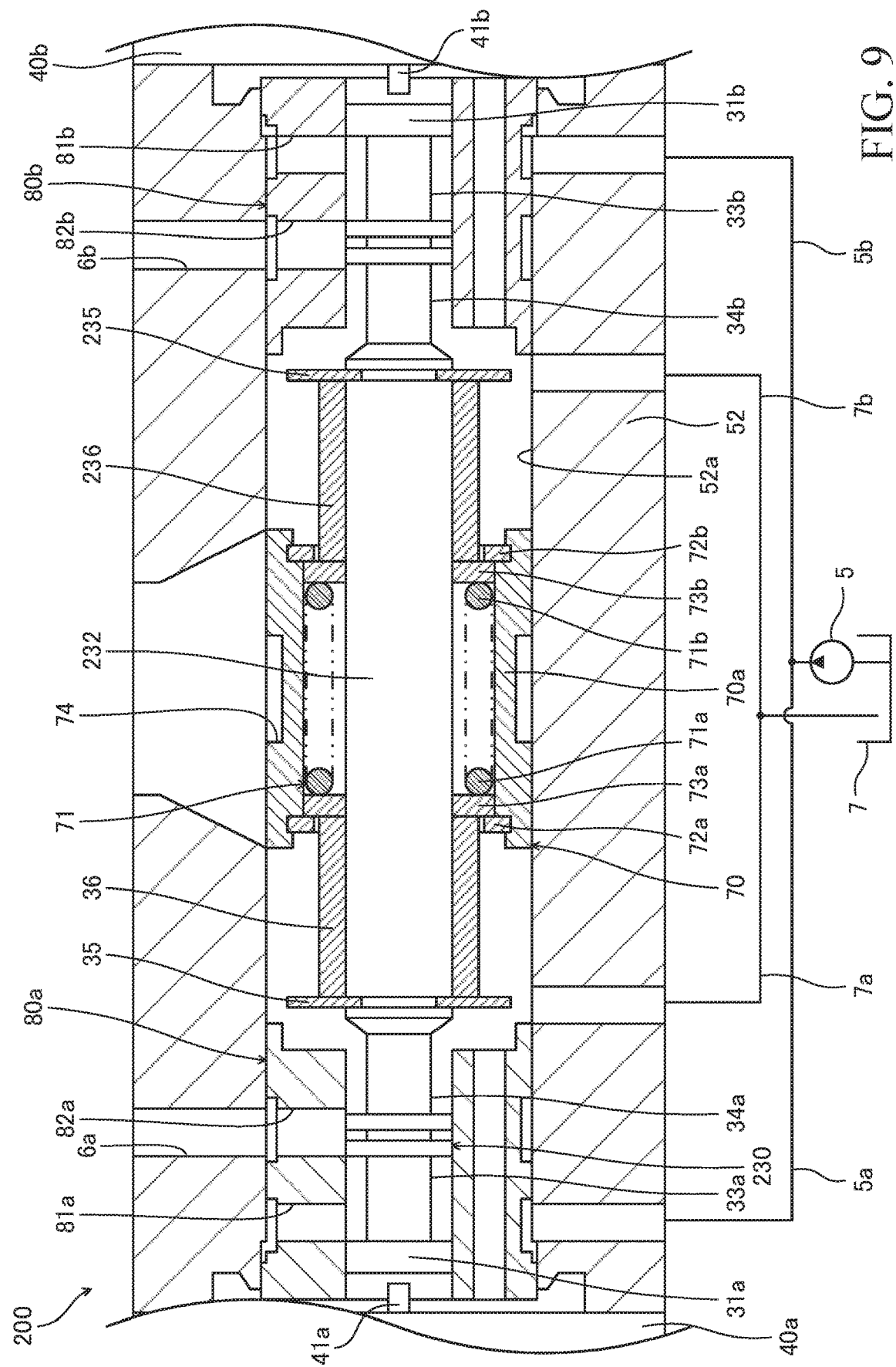
FIG. 9 is a sectional view of the servo regulator according to a second embodiment of the present invention and illustrates it correspondingly to FIG. 3.

FIG. 9 is a sectional view of the servo regulator 200 according to the second embodiment and illustrates it correspondingly to FIG. 3. The large diameter portion 32b (see FIG. 3) is not formed in a connecting portion 232 in the servo regulator 200, and a collar (second support portion) 236 is provided on an outer periphery of the connecting portion 232.

A snap ring 235 is fixed to the vicinity of the second control portion 31*b* in the connecting portion 232 of a spool 230, and removal of the collar 236 from the connecting portion 232 is prevented by the snap ring 235. The collar 236 can be removed from the spool 230 by removing the snap ring 235 from the spool 230. As described above, the collar 236 is detachably provided on the spool 230.

In the servo regulator 200, the collar 236 is detachably provided on the spool 230 in addition to the collar 36. Thus, when the servo regulator 200 is assembled, the spool spring 71 can be assembled to the spool 230 from both ends of the spool 230 without deformation by removing both the collar 36 and the collar 236 from the spool 230. Therefore, a change in the characteristic of the spool spring 71 can be prevented, and the assembling performances of the servo regulator 200 can be improved.

The constitution, actions, and effects of the embodiments of the present invention will be described below in summary.

In this embodiment, the servo regulator 100 or 200 includes the servo piston 20 slidably accommodated in the case 50, the first pressure chamber 54*a* and the second pressure chamber 54*b* provided by facing the both end portions of the servo piston 20, the spool 30 or 230 configured to control the pressures in the first pressure chamber 54*a* and the second pressure chamber 54*b* by moving by the first solenoid 40*a* and the second solenoid 40*b*, the spool spring 71 provided on the outer periphery of the spool 30 or 230 and configured to bias the spool 30 or 230 against the thrusts of the first solenoid 40*a* and the second solenoid 40*b*, the collar 36 provided on the spool 30 or 230 and configured to support the one end portion 71*a* of the spool spring 71 when the spool 30 or 230 is moved to the S1 direction for raising the pressure in the first pressure chamber 54*a*, and the large diameter portion 32*b* and the collar 236 provided on the spool 30 or 230 and configured to support the other end portion 71*b* of the spool spring 71 when the spool 30 or 230 is moved to the S2 direction for raising the pressure in the second pressure chamber 54*b*, and at least one of the collar 36 and the large diameter portion 32*b* as well as the collar 236 is detachably provided on the spool 30 or 230.

In this constitution, at least one of the collar 36 and the large diameter portion 32*b* as well as the collar 236 is detachably provided on the spool 30 or 230. Thus, when the servo regulator 100 or 200 is assembled, the spool spring 71 can be assembled to the integrated spool 30 or 230 without deformation by removing at least one of the collar 36 and the large diameter portion 32*b* as well as the collar 236 from the spool 30 or 230. Therefore, the spool 30 or 230 is integrated, and a change in the characteristic of the spool spring 71 can be prevented, and the stability of the operations of the servo regulator 100 or 200 can be improved.

Moreover, in this embodiment, the servo regulator 100 or 200 further includes the first retainer 73*a* provided between the collar 36 and the one end portion 71*a* of the spool spring 71 and configured to support the one end portion 71*a* of the spool spring 71 both when the spool 30 or 230 is moved to the S1 direction and to the S2 direction and the second retainer 73*b* provided between the large diameter portion 32*b* as well as the collar 236 and the other end portion 71*b* of the spool spring 71 and configured to support the other end portion 71*b* of the spool spring 71 both when the spool 30 or 230 is moved to the S1 direction and to the S2 direction, and the first retainer 73*a* is moved with the spool 30 or 230 when the spool 30 or 230 is moved to the S1 direction and is relatively moved with respect to the spool 30 or 230 in accordance with the movement of the servo piston 20 when the spool 30 or 230 is moved to the S2 direction, the second retainer 73*b* is moved with the spool 30 or 230 when the spool 30 or 230 is moved to the S2 direction and is relatively moved with respect to the spool 30 or 230 in accordance with the movement of the servo piston 20 when the spool 30 or 230 is moved to the S1 direction, the spool spring 71 is compressed between the first retainer 73*a* and the second retainer 73*b* with the relative movement of the spool 30 or 230 in the S2 direction with respect to the first retainer 73*a* and the biasing force of the spool spring 71 is increased, and the spool spring 71 is compressed between the first retainer 73*a* and the second retainer 73*b* with the movement of the spool 30 or 230 to the S1 direction with respect to the second retainer 73*b*, and the biasing force of the spool spring 71 is increased.

In this configuration, when the spool 30 or 230 is moved to the S2 direction, the first retainer 73*a* is relatively moved with respect to the spool 30 or 230 in accordance with the movement of the servo piston 20, the spool spring 71 is compressed between the first retainer 73*a* and the second retainer 73*b*, and the biasing force of the spool spring 71 is increased. Moreover, when the spool 30 or 230 is moved to the S1 direction, the second retainer 73*b* is relatively moved with respect to the spool 30 or 230 in accordance with the movement of the servo piston 20, the spool spring 71 is compressed between the first retainer 73*a* and the second retainer 73*b*, and the biasing force of the spool spring 71 is increased. Thus, the spool 30 or 230 is biased by the one spool spring 71 both when it is moved to the S1 direction and to the S2 direction. Therefore, fluctuation in the control characteristic caused by the fluctuation in the characteristic of the spool spring 71 can be reduced.

Moreover, the servo regulator 100 or 200 further includes the spring holder 70 configured to hold the spool spring 71 and positioned by the both end portions 71*a* and 71*b* of the spool spring 71 through the first retainer 73*a* and the second retainer 73*b* in this embodiment.

In this configuration, the spring holder 70 is positioned by the both end portions 71*a* and 71*b* of the spool spring 71 through the first retainer 73*a* and the second retainer 73*b*. Thus, the biasing force of the spool spring 71 can be increased by compressing the spool spring 71 by the first retainer 73*a* or the second retainer 73*b* with the movement of the spool 30 or 230 with respect to the spring holder 70. Therefore, the spool 30 or 230 can be biased by the one spool spring 71 both when the spool 30 or 230 is moved to the S1 direction and to the S2 direction, and fluctuation in the control characteristic can be reduced.

Moreover, the spring holder 70 has the holder body 70*a* configured to accommodate the spool spring 71, the first snap ring 72*a* provided on the inner periphery of the holder body 70*a* and configured to support the one end portion 71*a* of the spool spring 71 through the first retainer 73*a* when the spool 30 or 230 is moved to the S2 direction, and the second snap ring 72*b* provided on the inner periphery of the holder body 70*a* and configured to support the other end portion 71*b* of the spool spring 71 through the second retainer 73*b* when the spool 30 or 230 is moved to the S1 direction, and at least one of the first snap ring 72*a* and the second snap ring 72*b* is detachably provided on the holder body 70*a*.

In this configuration, at least one of the first snap ring 72*a* and the second snap ring 72*b* is detachably provided on the holder body 70*a*. Thus, when the servo regulator 100 or 200 is to be assembled, the spool spring 71 can be accommodated in the holder body 70*a* without deformation by removing at least one of the first snap ring 72a and the second snap ring 72b from the holder body 70a. Therefore, a change in the characteristic of the spool spring 71 can be prevented, and the stability of the operation of the servo regulator 100 or 200 can be improved.

Moreover, the spool 30 has the small diameter portion 32a through which the spool spring 71 is inserted and the large diameter portion 32b formed continuously from the small diameter portion 32a and having the outer diameter larger than the small diameter portion 32a, and the large diameter portion 32b supports the other end portion 71b of the spool spring 71 when the spool 30 is moved to the S2 direction in this embodiment.

In this configuration, the large diameter portion 32b supports the other end portion 71b of the spool spring 71 when the spool 30 is moved to the S2 direction. Thus, the support portion configured to support the other end portion 71b of the spool spring 71 can be formed integrally on the spool 30. Therefore, the number of components can be reduced, and the assembling performances of the servo regulator 100 can be improved while the stability of the operation of the servo regulator 100 is improved.

Although the embodiment of the present invention has been described above, the above embodiment is merely an illustration of one exemplary application of the present invention and is not intended to limit the technical scope of the present invention to the specific configuration of the above embodiment.

The present application claims a priority based on Japanese Patent Application No. 2017-053181 filed with the Japan Patent Office on Mar. 17, 2017, and all the contents of this application are incorporated herein by reference.

The invention claimed is:

1. A servo regulator, comprising:
   a servo piston slidably accommodated in a case;
   a first pressure chamber and a second pressure chamber respectively provided on opposite sides of the servo piston;
   a single spool configured to control pressures in the first pressure chamber and the second pressure chamber by moving in response to a thrust from a solenoid in first and second directions that are opposite to each other;
   a spring provided on an outer periphery of the spool and biasing the spool against a thrust of the solenoid, the spring having first and second ends that are opposite to each other in the first direction;
   a collar having a cylindrical shape and provided on the spool, so as to support the first end of the spring upon the spool being moved in the first direction and the pressure in the first pressure chamber being raised;
   a large diameter portion provided in the spool, or having a cylindrical shape and provided on the spool, so as to support the second end of the spring upon the spool being moved in the second direction and the pressure in the second pressure chamber being raised;
   a spring holder that holds the spring; and
   a first snap ring having a ring shape and being detachably provided on an outer periphery of the spool to prevent removal of at least one of the collar or large diameter portion from the spool by a biasing force of the spring, wherein
   the spring holder includes:
      a holder body having a cylindrical shape and accommodating the spring;
      a second snap ring having a ring shape and being provided on an inner periphery of the holder body, the second snap ring supporting the first end of the spring when the spool is moved in the second direction; and
      a third snap ring having a ring shape and being provided on the inner periphery of the holder body, the third snap ring supporting the second end of the spring when the spool is moved in the first direction,
   the spool is inserted in the at least one of the collar or large diameter portion, and
   the at least one of the collar or large diameter portion is provided between the spring and the first snap ring, and is inserted in the second snap ring or the third snap ring.

2. The servo regulator according to claim 1, further comprising:
   a first retainer having an annular shape and being provided between the collar and the first end of the spring, the first retainer supporting the first end of the spring when the spool is moved in the first direction and when the spool is moved in the second direction; and
   a second retainer having an annular shape and being provided between the large diameter portion and the second end of the spring, the second retainer supporting the second end of the spring when the spool is moved in the first direction and when the spool is moved in the second direction, wherein:
   the first retainer is moved with the spool when the spool is moved in the first direction, and is relatively moved with respect to the spool in accordance with movement of the servo piston when the spool is moved in the second direction;
   the second retainer is moved with the spool when the spool is moved in the second direction, and is relatively moved with respect to the spool in accordance with movement of the servo piston when the spool is moved in the first direction;
   upon the spring being compressed between the first retainer and the second retainer with the relative movement of the spool to the second direction with respect to the first retainer, the biasing force of the spring is increased; and
   upon the spring being compressed between the first retainer and the second retainer with the relative movement of the spool to the first direction with respect to the second retainer, the biasing force of the spring is increased.

3. The servo regulator according to claim 1, wherein:
   the spool has
      a small diameter portion in which the spring is inserted, and
      the large diameter portion being formed continuously from the small diameter portion and having an outer diameter larger than an outer diameter of the small diameter portion.

4. A servo regulator, comprising:
   a servo piston slidably accommodated in a case;
   a first pressure chamber and a second pressure chamber respectively provided on opposite sides of the servo piston;
   a single spool configured to control pressures in the first pressure chamber and the second pressure chamber by moving in response to a thrust from a solenoid in first and second directions that are opposite to each other;
   a biasing member provided on an outer periphery of the spool, and being configured to bias the spool against a thrust of the solenoid, the biasing member having first and second ends that are opposite to each other in the first direction;

a first support portion provided on the spool, and being configured to support the first end of the biasing member upon the spool being moved in the first direction and the pressure in the first pressure chamber being raised;

a second support portion provided on the spool and being configured to support the second end of the biasing member upon the spool being moved in the second direction and the pressure in the second pressure chamber being raised;

a holding member in which the spool is inserted, and being configured to hold the biasing member; and a retainer member detachably provided on an outer periphery of the spool to prevent removal of at least one of the first support portion or second support portion from the spool by a biasing force of the biasing member, wherein the holding member includes:
  an accommodating portion configured to accommodate the biasing member;
  a fifth support portion provided on an inner periphery of the accommodating portion, and being configured to support the first end of the biasing member when the spool is moved in the second direction; and
  a sixth support portion provided on the inner periphery of the accommodating portion, and being configured to support the second end of the biasing member when the spool is moved in the first direction;

the spool is inserted in the at least one of the first support portion or second support portion, and the at least one of the first support portion or second support portion is provided between the biasing member and the retainer member, and is inserted in the fifth member or the sixth member.

5. The servo regulator according to claim 4, further comprising:

a third support portion provided between the first support portion and the first end of the biasing member, and being configured to support the first end of the biasing member when the spool is moved in the first direction and when the spool is moved in the second direction; and a fourth support portion provided between the second support portion and the second end of the biasing member, and being configured to support the second end of the biasing member when the spool is moved in the first direction and when the spool is moved to the second direction, wherein the third support portion is moved with the spool when the spool is moved to the first direction and is relatively moved with respect to the spool in accordance with movement of the servo piston when the spool is moved to the second direction;

the fourth support portion is moved with the spool when the spool is moved to the second direction and is relatively moved with respect to the spool in accordance with movement of the servo piston when the spool is moved to the first direction;

upon the biasing member being compressed between the third support portion and the fourth support portion with the relative movement of the spool to the second direction with respect to the third support portion, the biasing force of the biasing member is increased; and upon the biasing member being compressed between the third support portion and the fourth support portion with the relative movement of the spool to the first direction with respect to the fourth support portion, the biasing force of the biasing member is increased.

6. The servo regulator according to claim 5, wherein the holding member is positioned by the first and second ends of the biasing member respectively through the third support portion and the fourth support portion.

7. The servo regulator according to claim 5, wherein:

the fifth support portion is configured to support the first end portion of the biasing member through the third support portion when the spool is moved in the second direction;

the sixth support portion is configured to support the second end of the biasing member through the fourth support portion when the spool is moved in the first direction, and at least one of the fifth support portion or sixth support portion is detachably provided on the accommodating portion.

8. The servo regulator according to claim 4, wherein:

the spool has
  an insertion portion in which the biasing member is inserted, and
  a large diameter portion formed continuously from the insertion portion and having an outer diameter larger than an outer diameter of the insertion portion; and the large diameter portion is the second support portion.

9. The servo regulator according to claim 4, wherein;

the first support portion is relatively moved with respect to the first end of the biasing member with the spool when the spool is moved in the second direction; and the second support portion is relatively moved with respect to the second end of the biasing member with the spool when the spool is moved in the first direction.

* * * * *